Figure 1:
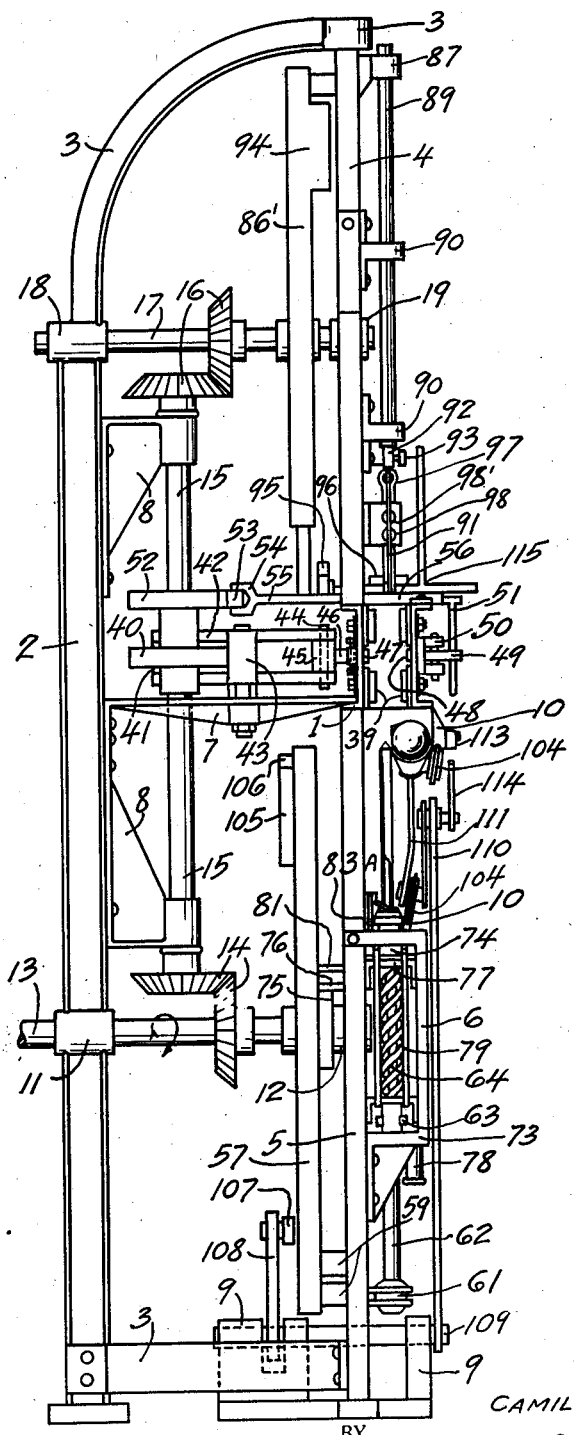

March 6, 1945.  C. C. ENRIGHT  2,370,642
MACHINE FOR SHAPING AND BINDING ARTICLES
Filed Aug. 13, 1940  8 Sheets-Sheet 1

INVENTOR.
CAMILLUS C. ENRIGHT
BY  Albert Sperry
ATTORNEY

March 6, 1945.    C. C. ENRIGHT    2,370,642
MACHINE FOR SHAPING AND BINDING ARTICLES
Filed Aug. 13, 1940    8 Sheets-Sheet 3

INVENTOR.
CAMILLUS C. ENRIGHT
BY
Albert Sperry.
ATTORNEY

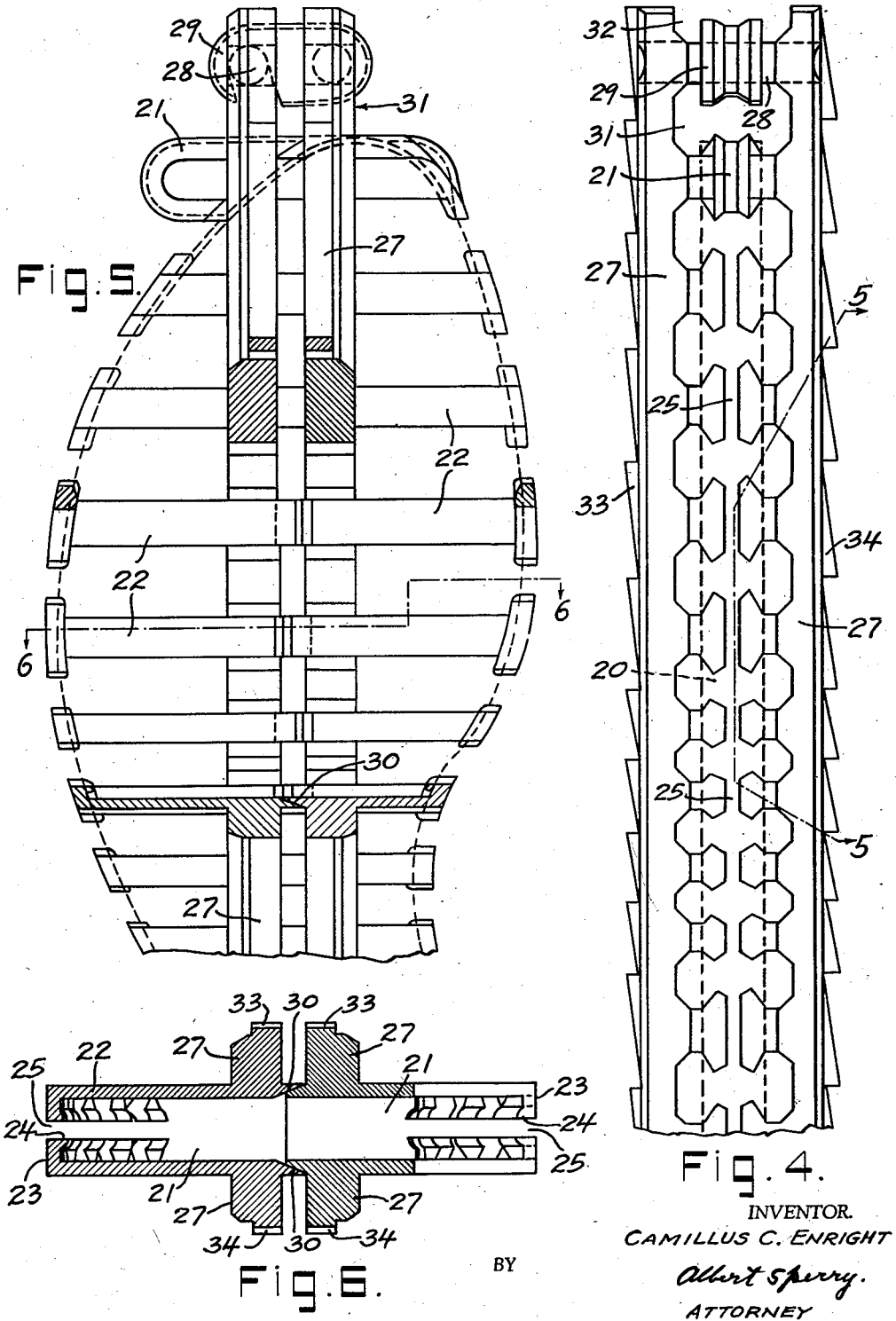

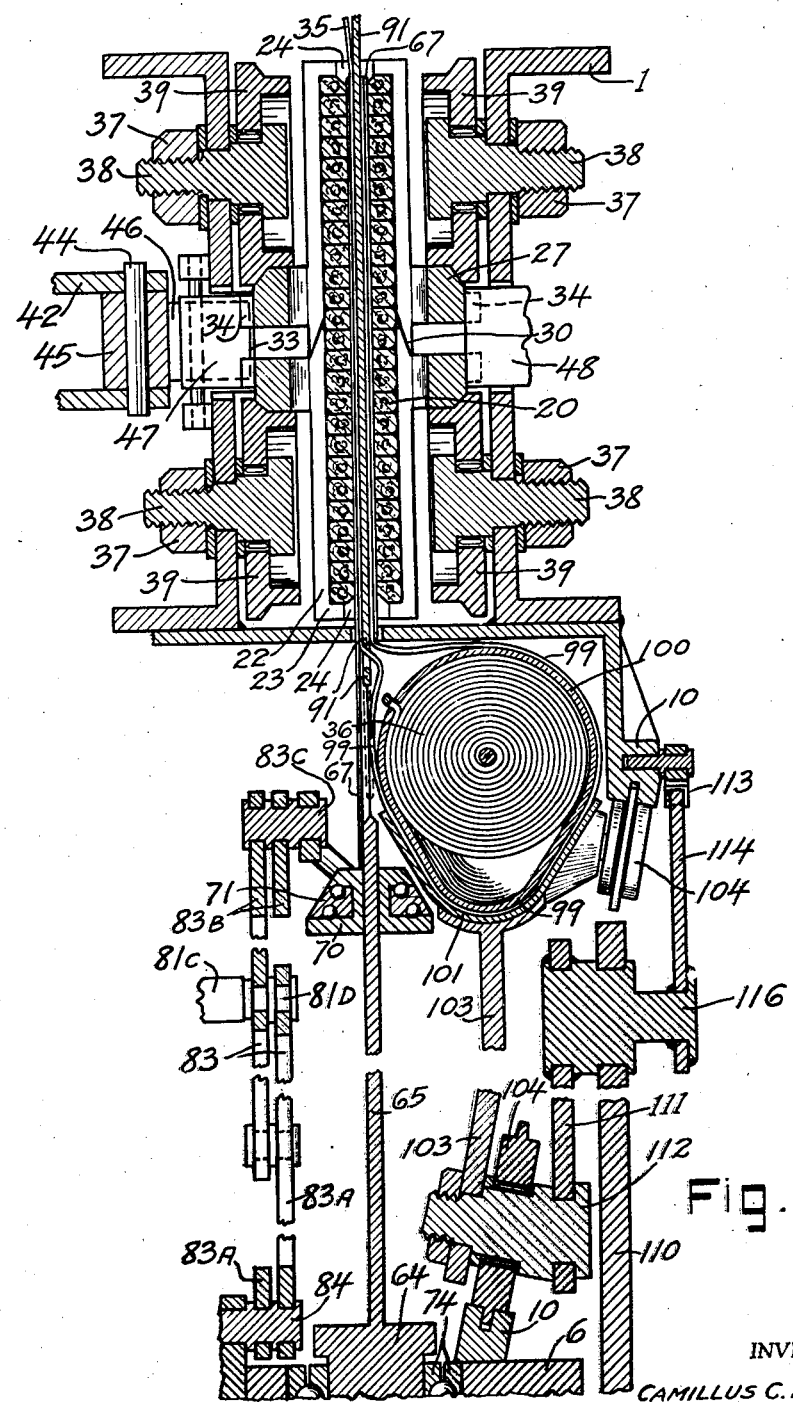

March 6, 1945. C. C. ENRIGHT 2,370,642
MACHINE FOR SHAPING AND BINDING ARTICLES
Filed Aug. 13, 1940 8 Sheets-Sheet 6
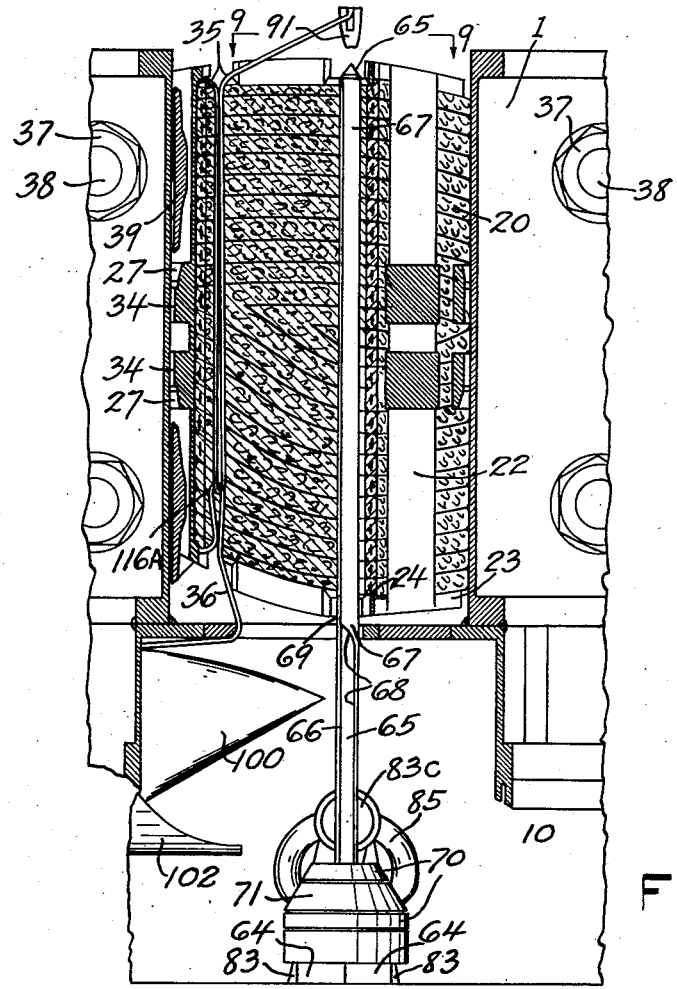
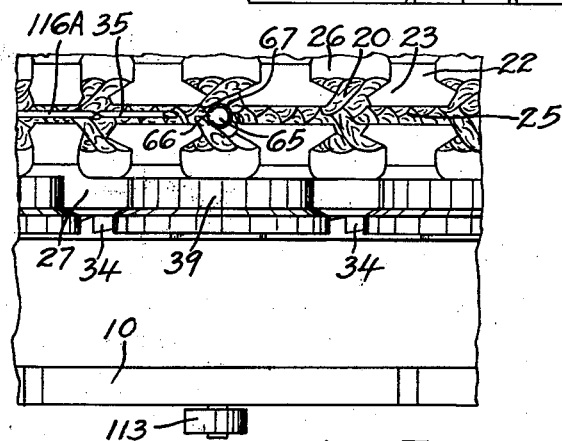
INVENTOR.
CAMILLUS C. ENRIGHT
BY Albert Sperry
ATTORNEY

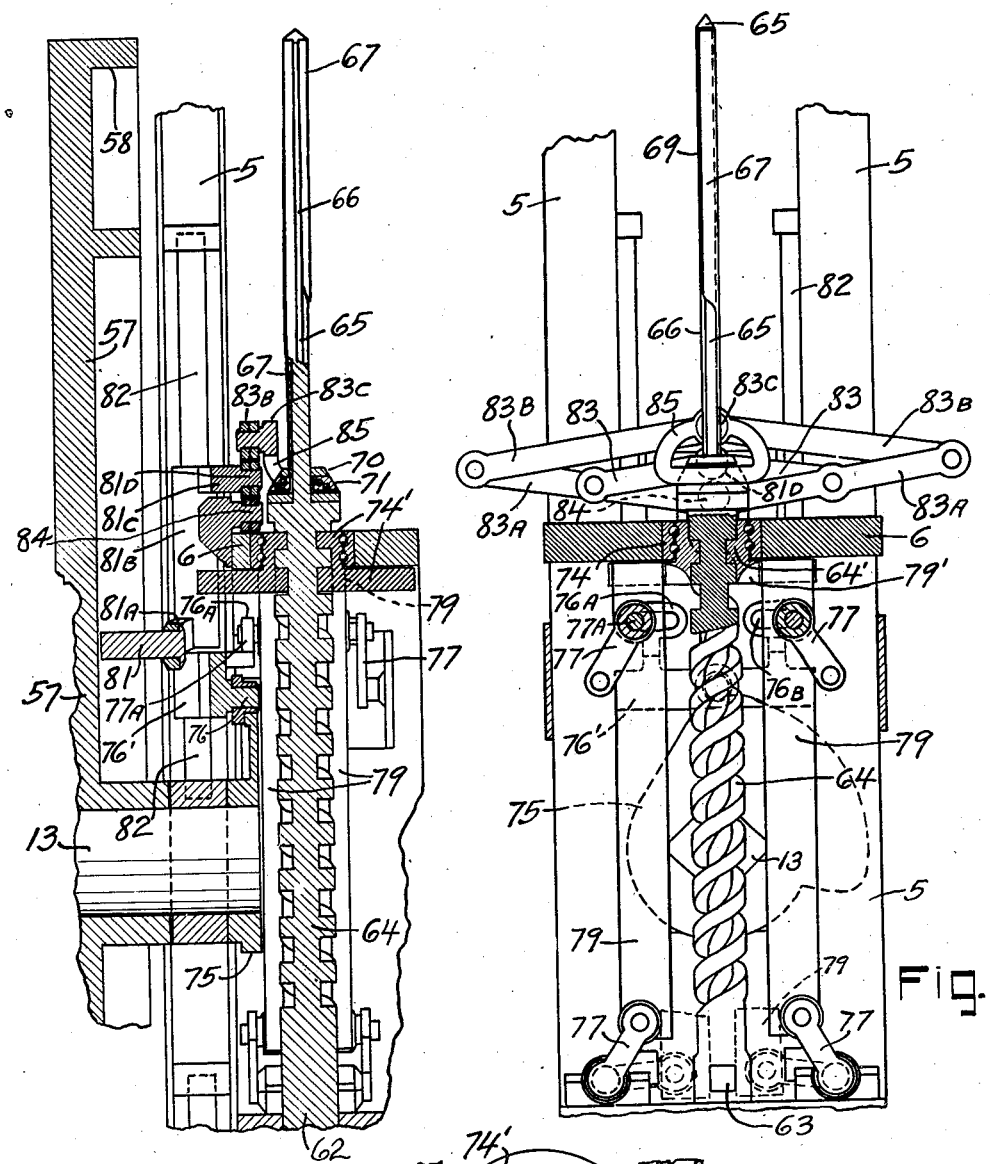

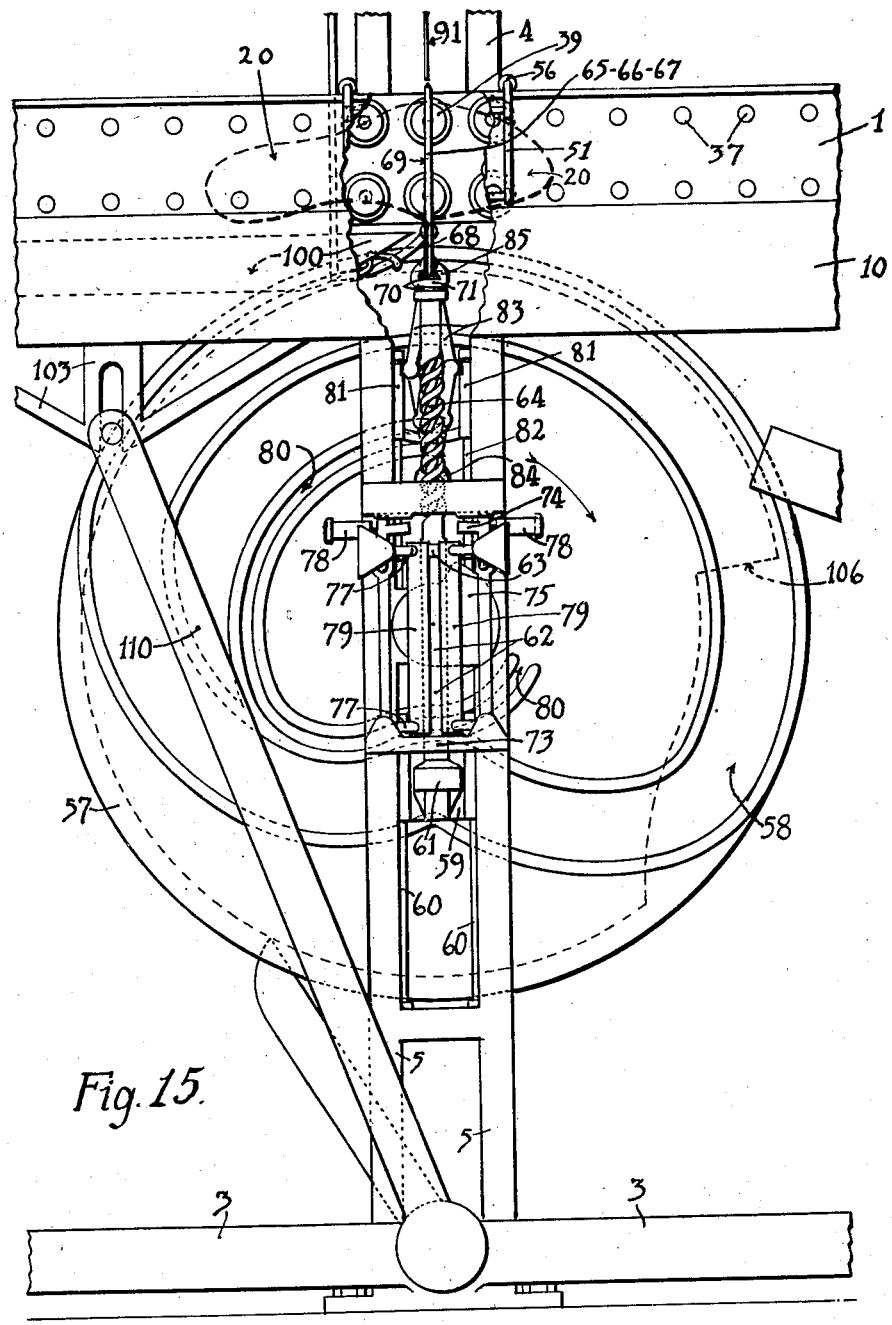

Patented Mar. 6, 1945

2,370,642

UNITED STATES PATENT OFFICE 2,370,642

MACHINE FOR SHAPING AND BINDING ARTICLES

Camillus Calleja Enright, New Hope, Pa.

Application August 13, 1940, Serial No. 352,382

13 Claims. (Cl. 112—2)

My invention relates to the manufacture of rope soles for footwear, mats, pads and other articles formed of strands or coils of rope, braid or other fibrous material, and to machines and methods for stitching such materials.

In the manufacture of rope soles and the like heretofore the needle and thread used for stitching the material have been subjected to great strain in being forced through the material, with the result that the needles are frequently bent or broken and the thread often breaks during the stitching operations. Moreover, most rope soles have been made heretofore by hand or by machines which are slow in operation.

In accordance with my invention these objections to constructions and methods of the prior art are overcome and means provided which are rapid in operation and relieve the needle and thread from objectionable strain during the stitching operation. My invention further provides for variations in the spacing of the stitches in the work and serves to compress the material into the desired shape and in the direction in which it is stitched so that the finished product remains firm and tight when the pressure is removed after stitching.

In the construction illustrated in the drawings and hereafter described the machine embodies a work holder which is adapted to receive strands or coils of rope to form a rope sole. The material is placed in the work holder and is compressed transversely of the coils or strands in a direction parallel to that in which the material is to be stitched. The work holder, carrying the work, is then moved in successive steps past a reciprocating needle to stitch the material. The length of each step is controlled to space the stitches different distances apart in different portions of the work and the length of each step is determined independently of every other step. It is therefore possible to pass work holders carrying material for forming soles in different sizes or for forming different articles, one after another through the machine and past the needle and to stitch each article in the manner desired without a change or adjustment in the machine or its various elements.

In order to relieve the needle and thread from excessive strains in stitching the work I provide the machine with means for punching or boring a hole through the work at the point where the stitch is to be formed. I further provide a guard or other means for restraining the material about the hole thus formed so as to keep the hole open and permit the needle and thread to be passed freely through the material to form a stitch. Thereafter, the guard is withdrawn from engagement with the work so that the material about the hole may collapse into engagement with the thread.

One of the objects of my invention is to provide improved means for stitching rope soles, mats, pads and other articles formed of fibrous materials.

Another object of my invention is to relieve the needle and thread from excessive strains during the stitching of heavy, dense or tough materials.

A further object of my invention is to provide novel means for spacing the stitches formed in the work by a sewing machine.

Another object of my invention is to provide improved methods for stitching rope soles and similar products.

These and other objects and features of my invention will appear from the following description thereof in which reference is made to the figures of the accompanying drawings.

Figure 2:
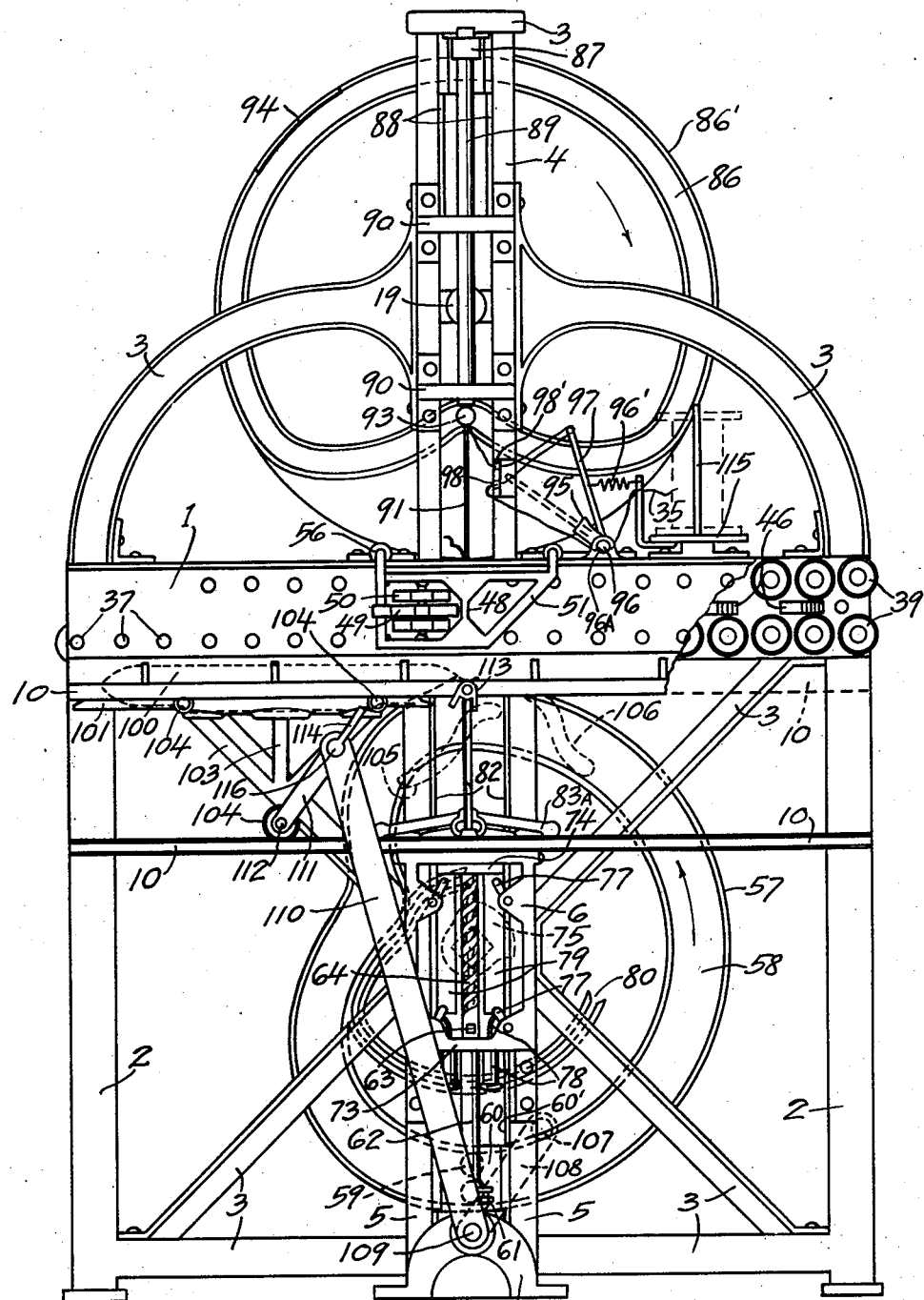
Figure 3:
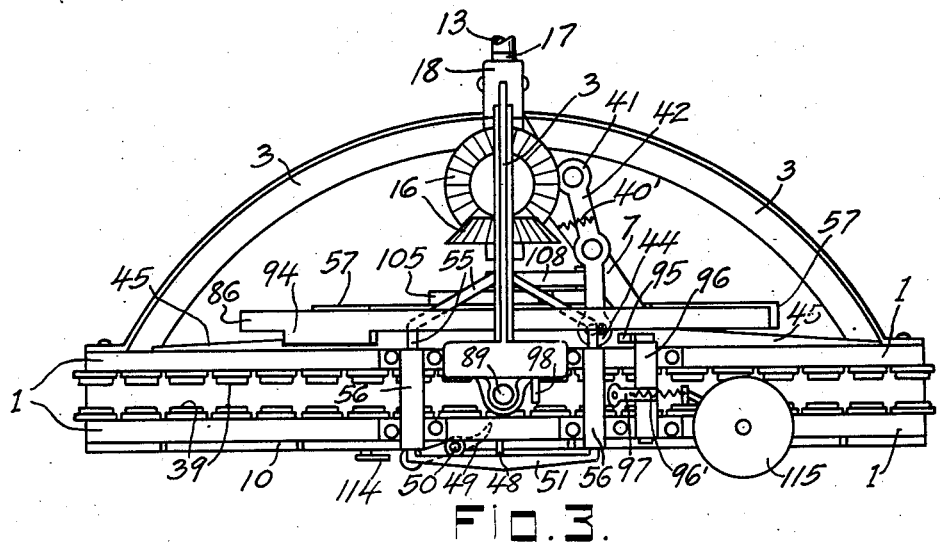
Figure 10:
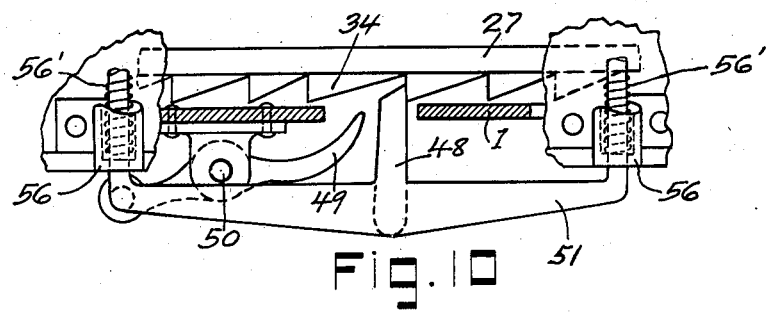
Figure 11:
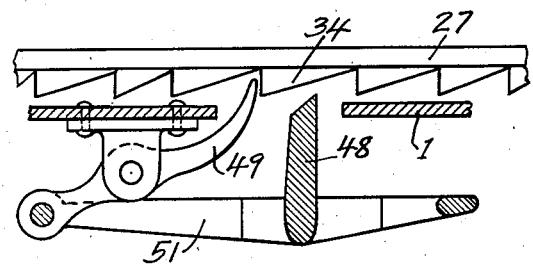

In the drawings:

Fig. 1 is a side elevation of one form of sewing machine embodying my invention, Fig. 2 is a front elevation of the sewing machine shown in Fig. 1, with parts thereof broken away, Fig. 3 is a top plan view of the sewing machine illustrated in Figs. 1 and 2, Fig. 4 is a top plan view of a portion of one preferred form of work holder adapted for use in the sewing machine shown in Figs. 1 to 3, Fig. 5 is a side view of the portion of the work holder shown in Fig. 4 with parts broken away as indicated by the line 5—5 in Fig. 4, Fig. 6 is a vertical sectional view of the work holder shown in Figs. 4 and 5, Fig. 7 is a vertical sectional view through a portion of the machine shown in Fig. 2 taken on the center line thereof and showing the needle in lowered position, Fig. 8 is a vertical sectional view of the elements illustrated in Fig. 7 but taken at right angles thereto, Fig. 9 is a horizontal sectional view of the construction shown in Figs. 7 and 8 taken on the line 9—9 of Fig. 8, Figs. 10 and 11 are enlarged views of details of the escapement mechanism for advancing the work holders, Figs. 12 to 14 inclusive are enlarged views of details of the construction showing the punch and guard in various positions, and Fig. 15 is a front elevation of an alternative form of sewing machine embodying my invention.

In that form of my invention chosen for purposes of illustration and shown in the drawings, the machine is provided with a horizontally extending work receiving channel 1 supported by vertically extending members 2 of the machine frame. The upper portion of the frame 2 is provided with braces 3 which hold the upper needle guiding support 4 in place whereas the braces 3 in the lower portion of the frame hold the punch guiding support 5 in place.

The bracket 6 on support 5 supports the operating means for the punch and the needle guard, the bracket 7 which extends from the rear vertical frame member 2 to the channel 1 supports the elements for advancing the work holders past the needle, and the brackets 8 secured to the rear frame member 2 support the bearings for vertical drive shaft 15.

The main drive shaft 13 is connected to a suitable source of power such as a motor or pulley and is journaled in a rear bearing 11 in rear frame member 2 and a front bearing 12 in the support 5. Bevelled gears 14 on the main drive shaft 13 and vertical drive shaft 15 serve to drive the needle actuating drive shaft 17 through bevelled gears 16. The shaft 17 is journalled at its rear end in the bearing 18 on the rear vertical frame member 2 and is journalled at the front end in the bearing 19 on the upper support 4.

The work holders

The work holders which are passed through the channel 1 may be of any suitable form depending upon the type of article being produced. As shown, in Figs. 4, 5 and 6, these holders are employed for forming rope soles for footwear and are split longitudinally into upper and lower sections which extend about the opposite edges of the coils or strands of material 20 from which the sole is to be formed. Each section of the holder is formed with longitudinally extending beams or tracks 27 on the outer faces thereof and adjacent the longitudinal axis of the holder. Spaced ribs 22 extend from the tracks 27 toward the edges of the holder and are provided with inwardly turned extremities 23 for engaging and retaining the material in the holder. Preferably also the extremities 23 are formed with cleats or rearwardly turned projections 24 which serve to compress the material adjacent the space 25 between the inturned extremities of oppositely located ribs on the holder. The space 25 is provided so that the work may be stitched longitudinally of the holder from one end thereof to the other.

The opposite tracks and opposed pairs of ribs of each section of the holder are connected and held in place by connecting members 21 at the opposite ends of the tracks 27. The sections are connected together and clamped about the work by pivoted hooks 29 on one section which engage pins 28 on the other.

In order that the work may be molded or shaped prior to stitching and remain firm and tight so as to retain its molded shape after stitching and when removed from the work holder, the sections of the holder are provided with telescoping surfaces 30 which permit the sections to move toward and away from each other to compress and shape the material in a direction parallel to that in which it is to be stitched.

It will be noted that there is a space 31 between the hook 29 and the connecting member 21 on the holder and the extremities of the tracks 27 project beyond the hook 29 to provide a space 32 between one holder and another when they are passed in succession through the machine. These spaces are provided to permit the formation of stitches about the connecting member and hook so that when the stitches are cut between the holders loose ends are presented which may be used for finishing the sole or other article.

The stitch spacing means

In order to move the holder step by step past the needle, suitable means are provided which are synchronized with respect to the operation of the needle to advance the holder one step after the formation of each stitch and prior to the formation of the next. These means are further constructed so that the length of each step is controlled and is made to correspond to the desired spacing of the stitches in different parts of the work.

In the construction illustrated for this purpose the tracks 27 on opposite faces of the holder are formed with ratchet teeth 33 and 34 which extend longitudinally of the path of movement of the work holder. The teeth 33 are used to advance the work holder and the teeth 34 are used to limit the forward movement of the work holder and control the length of each step. The teeth 33 face in one direction and the teeth 34 in the opposite direction. The length of the ratchet teeth 34, and preferably also the length of the teeth 33, are varied to correspond to the distance that the stitches are to be spaced in the work.

The holders are guided along the channel 1 as shown in Figs. 2, 3 and 7, by means of flanged rollers 39 which bear against the upper and lower surfaces of the tracks 27 on the upper and lower mold sections and on opposite sides of the holder. The rollers 39 are spaced vertically so as to urge the sections together and thereby operate to compress the work in a direction parallel to that in which the material is to be stitched. Each of the rollers is supported on axles 38 secured to channel 1 and are held in place by nuts 37 on the axles.

In order to move the work holder step by step past the needle projections 46 are formed on a reciprocating beam 45 (Figs. 1, 2, 3 and 7) and extend through slots in the channel 1 to engage the ratchet teeth 33 on the work holder. The beam 45 is reciprocated between successive operations of the needle by means of a cam 40 mounted on vertical drive shaft 15 for rotation therewith. The cam 40 is engaged by a follower 41 on a rocker arm 42 which is pivotally mounted at 43 on bracket 7 and urged toward cam 40 by a spring 40' shown in Fig. 3. The opposite end of the rocker arm 42 is provided with a connecting pin 44 which is yieldably mounted thereon and engages the beam 45 to reciprocate the beam and cause the projections 46 connected thereto to engage the teeth of ratchet 33 on the work holder. A spring pressed pawl 47 mounted on the channel 1 adjacent the needle is urged into engagement with each tooth of the ratchet 33 in turn to prevent recoil or retrograde movement of the work holder and to aid in accurately positioning the work for stitching.

By forming the teeth 33 of different lengths corresponding to the desired distance between the stitches to be formed in the work the length of each advancing step of the work holder may be varied. However, in order positively to control the length of each step and insure proper positioning of the work holder and work with respect to the needle, I prefer to provide positioning means shown in Figs. 10 and 11 to be in the form of a pawl 48 which is engageable with the oppositely facing teeth of ratchet 34 to limit or control the length of each step in the advancing movement of the work holder. The length of the teeth of ratchet 34 is therefore varied to correspond to the distance between stitches to be formed in the work. Moreover, the operation of the pawl 48 is synchronized with the operation of the needle so as to be moved into engagement with one of the teeth 34 prior to the formation of each stitch and to be disengaged therefrom after the stitch is formed so that the holder may be advanced another step by the projections 46 and ratchet 33. The pawl 48 is then brought in to engagement with the next tooth on ratchet 34 to limit the movement of the work holder and cooperate with pawl 47 and teeth 33 in positioning the work holder.

The pawl 48 is fixedly carried by frame 51 of a duplex escapement device. The escapement frame 51 is actuated by cam 52 on vertical shaft 15 through the action of the follower 53 carried by the yoke 54 on push rods 55. The push rods 55 are mounted in bearings 56 which contain springs for urging the follower 53 against the cam 52. Rotation of the shaft 15 and cam 52 causes the push rods 55 to be projected causing frame 51 and pawl 48 to move downward as seen in Figs. 10 and 11 and thus trip the pawl so that it disengages the teeth of the ratchet 34. A rocker arm 49 is pivotally mounted at 50 on channel 1 and is connected at one end to the escapement frame 51 so that movement of the escapement frame to disengage pawl 48 from ratchet 34 causes the free end of rocker arm 49 to swing into engagement with ratchet 34 and prevent unrestricted advance of the work holder. As the cam 52 rotates further the push rods 55 are retracted by the springs in bearing 56 and the frame 51 is moved toward the channel 1 so that pawl 48 will engage the next tooth on the ratchet 34 while the work holder is released by the free end of the rocker arm 49 so that it may advance and bring the next tooth firmly against the pawl 48. The work is thus accurately positioned in the desired location to insure the formation of stitches in predetermined spaced relation as determined by the ratchet 34 on the work holder.

Each work holder thus is provided with its own control means and infinite variation in the length of the steps and the distance between the stitches is possible. This enables the machine to be used in stitching articles of different size or different type, one after the other, without adjustment in the mechanism and yet to space the stitches in the different articles or in different parts of the same article any desired distance apart. Moreover, the stitch spacing is automatic and is determined by the work holder without care and attention on the part of the operator.

The punch and guard assembly

In order to permit the machine to be used in stitching of heavy, dense or tough materials, such as rope soles, and yet relieve the needle and thread from excessive strains, the machine is provided with a gimlet or punch, for forming a hole in the work for the passage of the needle and thread therethrough. I further provide guard means for restraining the material about the hole thus formed to hold the hole open until after the needle and thread have been passed therethrough to form a stitch.

The mechanism illustrated for this purpose is actuated by a flywheel 57 secured to the main drive shaft 13. The flywheel is provided with a cam slot 58 within which travel the rollers 59 on a reciprocating slide 60 movable vertically on track 60' on the punch guiding support 5 of the frame. The shape of the cam slot 58 is such that the slide 60 is caused to reciprocate vertically while the work holder is held stationary and then is held in its lowered position during advance of the work holder to its new position preparatory to the formation of another stitch.

The slide 60 carries a bearing 61 in which a vertical shaft 62 is mounted for rotation. The shaft 62 may therefore rotate about its longitudinal axis as it is raised by the action of the cam 58. The bracket 6 on support 5 is provided with a lower bearing member 73 and an upper bearing 74 for the shaft 62. The lower portion of the shaft 62 is cylindrical in form but provided with a radially extending lug 63 while the intermediate portion of the shaft is formed with spiral slots or threads 64. The upper extremity of shaft 62 is provided with the gimlet or punch 65 for forming a hole in the work.

A hollow tubular guard 67 is positioned to surround the punch 65 and is formed with a central duct or passage within which the punch fits. A slot 69 extends throughout the length of the guard so that the guard may be withdrawn from the work after a stitch is formed and without disturbing or interfering with the threads thereof. A projection 66 on the side of the punch fills the slot 69 when the punch and guard are moved into the work so that the punch and guard assembly present a smooth cylindrical surface as they rotate in penetrating the work. The projection 66 also serves in positioning the slot in the guard prior to formation of the stitch so that the slot will face the stitched material and permit withdrawal of the guard without rotation to pass the threads of the stitch.

The guard 67 is secured to a carrier 70 provided with a ring 71 mounted on suitable bearings. The carrier also is provided with a keyway for engaging the projection 66 on the punch to insure proper positioning and rotation of the guard 67 with respect to the punch while permitting the punch to move into and out of the central duct in the guard.

The punch actuating means

The punch and guard assembly are raised and lowered by the cam 58 on flywheel 57 whereas the elements are caused to rotate when penetrating the work and are thereafter held against rotation by means under the control of cam 75 on main drive shaft 13. The means illustrated in Figs. 12, 13 and 14 for rotating the shaft 62 and the punch and guard assembly as the shaft is raised, include the bearing 74 which has an inner bearing member 74' provided with recesses 79' into which locking devices 79 are movable. When in their upper engaging positions, as shown in Fig. 13, the locking devices 79 enter the recesses 79' and prevent rotation of the inner bearing member. The bearing member 74 also is provided with inwardly projecting elements 64' which enter the spiral slots 64 on the shaft 62 and therefore the locking of the bearing member 74' by devices 79 causes the shaft 62 to rotate as it is forced upward through the stationary bearing member by the cam 58.

After the punch and guard have reached their uppermost positions the locking members 79 are moved inward and downward. When moved to their lowered positions the locking members 79 release the inner bearing member 74' so that it may rotate freely whereas the lower portions of the locking members engage lugs 63 on the lower portion of shaft 62 so that the shaft is held against rotation as it descends, as indicated in dotted lines in Fig. 13.

The actuating means employed to cause the locking members to be raised and lowered at the proper periods in the cycle of operation are controlled by cam 75 on the main drive shaft 13. The actuating means include a member 76' which is movable vertically along the tracks 82 on frame 5 and provided with a cam follower 76 which engages the cam 75. The member 76' is also provided with projections 76A which have slots 76B for receiving the ends of pins 77A carried by the yokes 77 pivotally mounted on the frame 5 on opposite sides of the shaft 62. The locking members 79 are mounted on the middle sections of yokes 77 so that when the yokes are rocked by the downward movement of the member 76' the locking members are moved in an arc inwardly and downwardly out of engagement with the bearing member 74' and into positions to engage lugs 63 on shaft 62 to prevent rotation of the shaft.

With this construction the punch and guard are raised and caused to rotate as they enter the work in the work holder so as to bore a hole therein, and are caused to assume an uppermost or projected position in which the slot in the guard faces toward the stitched portion of the work in the holder. Thereafter the punch is withdrawn from within the guard without rotating the guard, leaving the central duct in the guard open to receive the needle and thread, and finally the guard is withdrawn from the work without rotation to allow the slot in the guard to pass the threads which form the stitch without disturbing or breaking the threads.

The guard actuating means

It is desirable to hold the guard in the work to restrain the material when the punch is withdrawn so as to keep open the hole formed by the guard and punch assembly and permit the needle and thread to enter the work without material restriction. For this purpose the flywheel 57 is provided with the cam surfaces 80 to receive a pin 81 on the lower bar 81A of carriage 81B slidably movable up and down along tracks 82 on the support 5. The upper bar 81C of carriage 81B is provided with a stud 81D to which the upper ends of links 83 are connected. The lower ends of these links are connected to the mid-points of arms 83A which are pivotally connected to the bracket 6 by means of a stationary pivot 84. The upper ends of the arms 83A are connected to links 83B by pin 83C. Member 85 formed integral with the ring 71 of the guard support 70 is secured to pin 83C.

With this construction the cam 80 on the flywheel serves to hold the guard 68 in its elevated position and in engagement with the work while the punch is withdrawn to allow the needle and thread to enter the guard. The cam 80 then serves to withdraw the guard from the work when the stitch has been formed and prior to the release of the work holder for movement to a new position.

The needle actuating means

The operation of the needle and the movements of the work holder, punch and guard are synchronized by the vertical drive shaft 15 which is driven from the main drive shaft 13 and serves in turn to drive the needle actuating drive shaft 17.

The shaft 17 carries a flywheel 86' formed with a cam slot 86 which receives a roller on carriage 87. The carriage 87 is mounted for reciprocation on tracks 88 on the needle guiding support 4, and is secured to the vertically positioned needle carrying shaft 89 slidably mounted in bearings 90 on the support 4. The needle 91 is secured in place on the shaft 89 by the holder 92 and threaded keeper 93 or by other suitable or conventional means.

The needle employed has an eye located adjacent the point thereof and receives thread 35 from a spool or other source of supply mounted on the holder 115. The thread passes from the holder beneath the flat surface 96A on rock shaft 96, to a lower threading eye 98 on support 4, then to the eye in the end of the arm 97 carried by shaft 96 and thence to an upper eye 98' on the support 4 and through keeper 93 on needle holder 92 to the eye of the needle. The rock shaft 96 and arm 97 are actuated by a projection 94 on flywheel 86'. The projection 94 engages the arm 95 on the end of rock shaft 96 and thus rotates the shaft 96 to present the flat face 96A thereof to the thread so as to release the thread 35 and swing the arm 97 toward its dotted lined position as the needle is moved downward to form a stitch. The distance between the eye in arm 97 and lower eye 98 on the support 4 is thus reduced to provide slack in the thread necessary for forming a loop 99 through which the shuttle 100 and its thread may pass.

The lower portion of the guard 67 is cut away at 68 in Figs. 7 and 8 to expose the needle and permit the formation of loop 99 and to allow the shuttle to pass sufficiently close to the needle to insure its passage through the loop so that thread 36 from the shuttle will be caught by the loop and lock the stitch formed by the needle.

The projection 94 on the flywheel passes beyond the arm 95 on shaft 96 after the shuttle 100 has passed through the loop 99. The shaft 96 is then rotated in a clockwise direction as seen in Fig. 2 under the action of a spring 96' to cause the edge of the flat side 96A of the shaft to pinch the thread from holder 115 while the arm 97 moves to its full line position to draw in the slack thread of loop 99 and close the loop about the shuttle thread 36, before the shuttle returns to its starting position, as shown in Fig. 2. The needle is then raised and withdrawn from the work while the thread 36 from the shuttle 100 serves to lock the stitch in the work.

The needle, punch and needle guard are located in axial alignment with the punch and guard on one side of the channel 1 through which the work holder is passed and the needle on the opposite side in position to enter the duct in the center of the guard 67 as the punch is withdrawn therefrom.

The timing in operation of the punch and needle is such that the needle enters the upper end of the guard as the punch moves downward to withdraw from the opening therein. The timing in operation of the needle and guard is such that the guard is not withdrawn from the work until the shuttle 100 has passed through the loop 99 and returned to the left hand position shown in Fig. 2 and the needle has ended its upward movement drawing the thread 36 into the work to tighten the stitch 116A. The guard then descends and the edges of the slot 69 in the guard pass downward on opposite sides of the thread 36.

The shuttle operation

The shuttle 100 shown in Figs. 1, 2 and 7 rests by gravity upon a cradle 101 mounted on shuttle carrying frame 103 having rollers 104 which engage the upper and lower tracks 10 extending horizontally from one side of the frame 2 to the other. The shuttle carrying cradle is moved back and forth along the tracks 10 by the operating lever 110 secured to a shaft 109 journalled in bearing 9 and having an actuating arm 108. The arm 108 is provided with a roller 107 engageable with the cam surfaces 105 and 106 on the rear face of flywheel 57. The movement of the shuttle is thus caused to take place in timed relation with respect to the operations of the other elements of the combination.

The operating lever 110 is provided at its upper end with a pivot pin 116 the inner end of which is provided with the downwardly extending arm 111 to which is secured the axle 112 of the lower roller 104 connected to the shuttle carrying frame 103. The outer end of the pivot pin 116 is provided with an upwardly extending arm 114.

As the operating lever 110 rocks to the right, as seen in Fig. 2, the pivot pin 116 travels in an arc about the shaft 109 raising the arm 114 until the upper end is in position to engage the stirrup piece 113 on the track 10. Continued movement of the lever 110 after engagement of the arm 114 with piece 113 causes the arm to turn about pivot pin 116 throwing the lower inner arm 111 to the right and causing the arms 111 and 114 to tilt in the opposite direction. The upper end of arm 114 then disengages the stirrup piece 113 while the piece is positioned to engage arm 114 on the return member and the lower roller 104 is thrown to the opposite side of pivot pin 116. In this way the shuttle is moved rapidly past its center position and the angular relation of the arms 111 and 114 with respect to lever 110 at the opposite ends of the path of travel of the shuttle are made to be similar insuring smooth operation of the shuttle and shuttle carrying frame by lever 110 without placing any strain upon the elements. Moreover, the desired length of travel of the shuttle is effected by this compound movement without increasing the length of the lever 110.

The construction shown in Fig. 15 differs from that above described only in that the form of the shuttle actuating cam 106 and of the connection between the operating lever 110 and shuttle carrying frame 102 are different in form and include only the pin and slot connection 117 instead of the quick acting construction of arm 114 and abutment 113 of Figs. 2 and 7.

Operation

The operation of the mechanism described above when used in stitching rope soles for footwear is generally as follows:

Strands of rope, braid or other fibrous material 20 are coiled or otherwise arranged in the general shape of the sole to be made and are placed within the cooperating sections of the work holder. These sections are forced toward each other and about the material and the sections are locked together by hooks 29 so that the material is compressed transversely of the convolutions or strands of the coil and in a direction parallel to that in which the material is to be stitched and is properly moulded or shaped.

The work holder carrying the work is then moved into the channel 1 of the sewing machine between rollers 39 which urge the holder sections together and further compress the material 20. The projections 46 on the reciprocating beam 45 then engage the ratchet teeth 33 on the work holder and advance the holder step by step toward the needle. On reaching a position adjacent the needle the spring pressed pawl 47 engages the first ratchet tooth 33 to prevent retrograde movement of the work holder while the pawl 48 of the escapement mechanism on frame 51 engages the teeth of ratchet 34 to limit the advance of the work holder and control the length of the steps through which the holder is thereafter advanced. Since the length of the ratchet teeth 33 and 34 are varied to correspond with the desired spacing of the stitches in the work the work holder is accurately moved into each stitching position.

After the work holder has been positioned for stitching the punch 65 and the hollow guard 67 are raised by the cam 58 on flywheel 57 and locking members 79 are moved to engage the inner bearing member 74' to insure rotation of the shaft 62. The shaft 62 and the punch and guard are therefore rotated as they are forced upward through the work in the holder to form a hole therethrough. Upon reaching their upper or fully projected position the guard is positioned with the slot 69 therein facing to the left as seen in Figs. 2, 8 and 9 to pass by the stitch when formed. The cam 75 then operates to cause the locking members 79 to disengage the bearing member 74' leaving it free to turn while the locking members move downward and inward toward each other so as to engage the projection 63 on the lower portion of shaft 62. As the flywheel continues to rotate the shaft 62 is moved downward without rotation. However, since the guard 67 is held in its raised, work engaging position by the action of cam 80 and links 83, 83A and 83B as shown in Fig. 15 the punch 65 is withdrawn from the central opening or duct in the guard 67 to permit unrestricted passage of the needle and thread downward through the work.

As the punch 65 moves downward from within the guard the needle 91 is moved downward into the upper end of the guard until it projects below the work holder and forms the loop 99 in the thread, as shown in Fig. 7. The cam 105 on flywheel 57 then actuates the lever 110 to move the shuttle 100 through the loop 99 after which the arm 97 is released from cam 94 on upper flywheel 86 and serves to tighten the loop 99 about the shuttle thread 36. The shuttle then moves back to the left hand position shown in Fig. 2 and the needle is raised completing the stitch while the guard 67 is lowered and withdrawn from the work as the threads pass between the edges of the slot 69 in the guard.

The machine has then completed its cycle of operations and the various elements are restored to their initial positions preparatory to the formation of another stitch. The work holder is then advanced a predetermined distance to space the next stitch the desired distance from the one just completed. When the work holder passes beyond the needle stitches are formed over the connecting member 21 and hook 29 of the holder and these stitches are cut leaving loose threads for finishing the sole.

In describing the form of my invention illustrated in the drawings I have made particular reference to the manufacture of rope soles for footwear. However, my invention is by no means limited to this particular application thereof since it will be evident that the binder employed need not be thread but may be twine, wire strands of any type of material or injected adhesive material. Similarly the form of stitch produced may be a chain stitch or of any other preferred type. I also wish it particularly understood that the invention is adapted for use in stitching or binding a great variety of articles other than rope soles and mention by way of example mats, pads and in general any articles or bundles formed of rope, tape, yarn, rove, braid or fibrous material such as grasses, hemp or other materials arranged in lapped, coiled, overlying or matted relation.

It will also be apparent that various novel elements, constructions and combinations of parts of the character herein described may be changed in form or used in other combinations and relations without departing from my invention. It should therefore be understood that the term "sewing machine" as used in the claims is intended to refer broadly to any type of sewing machine, binder or stitching device or mechanism. Moreover, in referring to the work holder and its movement it should be understood that various features thereof are adapted for use in forming articles which are formed of plastics or are secured together by means which embody a binder in addition to or in lieu of sitches for maintaining the shape of the finished article.

I claim:

1. In a sewing machine a work holder, a needle movable into and out of engagement with work in said holder to form stitches therein, means for advancing said work holder past said needle, elements carried by the work holder and spaced different distances apart lengthwise of the path of movement of the work holder corresponding to the desired spacing of the stitches in the work, positioning means engageable successively with each of said elements to interrupt the advance of the work holder at intervals determined by the spacing of said elements, and means connected to said positioning means and synchronized with respect to the operations of the needle to cause said positioning means to engage an element on the holder prior to the formation of each stitch and to disengage said element subsequent to the formation of each stitch.

2. In a sewing machine, means for controlling the distance work is moved between successive stitches formed in the work by said machine comprising a ratchet having teeth of different length corresponding to the distance between successive stitches, a pawl engageable with said teeth and means for disengaging said pawl from each tooth in succession subsequent to the formation of each stitch.

3. In a sewing machine having a reciprocating needle, a work holder and means for moving the work holder past said needle in successive steps between reciprocations of the needle, the combination of stop means located different distances apart lengthwise of the path of movement of the work holder, means engageable with said stop means to control the length of said steps and the distance between successive stitches formed in the work by said needle, and means for moving the latter means out of engagement with said stop means after the completion of each stitch.

4. In a sewing machine having a reciprocating needle, a work holder and means for moving the work holder past said needle, a ratchet element having teeth of different length, a pawl element engageable with the teeth of said ratchet, one of said elements being connected to the work holder, and the other being connected to the holder moving means, and means actuated in timed relation to the operation of the needle to move said ratchet and pawl into engagement whereby the work holder is advanced different distances between successive stitches formed in the work by said needle.

5. In a sewing machine having a reciprocating needle, a work holder and means for moving the work holder past said needle in successive steps between reciprocations of the needle, the combination of a ratchet carried by the holder, a pawl positioned to engage said ratchet to limit the length of said steps, said ratchet having successive teeth of different length corresponding to the distance between successive stitches to be formed in the work by said needle and means for disengaging the pawl from the ratchet upon completion of each stitch.

6. In a sewing machine, a work holder, a punch located on one side of the work holder, means for reciprocating the punch for forming a hole in the material to be sewn, means movable into engagement with the material to keep open the hole formed by the punch, a reciprocating needle located on the opposite side of the work holder means for passing the needle into and out of said hole while said hole maintaining means is in engagement with the material, means for removing said hole maintaining means from the material to permit collapse of the material about said hole whereby the material may be stitched without excessive strain upon the needle and the thread carried thereby and means for moving said work holder past said punch and needle between reciprocations thereof to form successive stitches in the work.

7. In a sewing machine, a work holder, a needle, means for moving the work holder in successive steps past the needle, a guard having a duct therein, means for forcing said guard through material in the work holder, means for moving the needle into said duct while the guard is in engagement with the material whereby strain upon the needle and the thread carried thereby is reduced, means for removing the guard from the material, and means for holding the work holder stationary during movements of the guard and needle.

8. In a sewing machine, a punch, means for forcing the punch into material to be sewn, a hollow guard extending about said punch and movable therewith into the material to be sewn, means for withdrawing the punch from the guard, means for moving a needle into the opening in the guard from which the punch is removed while the guard remains in the material, and means for withdrawing the guard from the material after the needle has entered said opening.

9. In a sewing machine, a work holder, a punch, a tubular guard surrounding the punch, means for moving the punch and guard together into work carried by the work holder, means for rotating the punch and guard during the advance thereof into the work, means for withdrawing the punch from within the guard while leaving the guard in engagement with the work, means for passing a threaded needle into the opening in the guard from which the punch is withdrawn to form a stitch, and means for withdrawing the guard and needle from the work, said guard being slotted longitudinally to permit the withdrawal of the guard without interference with the stitch formed by the needle.

10. In a sewing machine, a work holder, a punch, a tubular guard surrounding the punch, means for moving the punch and guard together into work carried by the work holder, means for rotating the punch and guard during the advance thereof into the work, means for withdrawing the punch from within the guard while leaving the guard in engagement with the work, means for passing a threaded needle into the opening in the guard from which the punch is withdrawn to form a stitch, means for withdrawing the guard and needle from the work, said guard being slotted longitudinally to permit the withdrawal of the guard without interference with the stitch formed by the needle, and means for positioning the guard so that the slot therein faces in the direction of the stitch when the punch is withdrawn from the work so that the guard may be withdrawn without rotation thereof to avoid interference with the stitch formed by said needle.

11. In a sewing machine, a needle, means for reciprocating said needle, a work holder having openings therein for entry of the needle to stitch the work, said openings being spaced different distances apart lengthwise of the work holder to vary the location of the stitches in the work, and means for moving the work holder in successive steps past said needle, including a plurality of control elements, each independently formed to correspond to the spacing between successive openings in the work holder to vary the length of each step in which said work holder is moved by said holder moving means to bring each of said openings in succession into registry with said needle.

12. In a sewing machine, a needle, means for reciprocating said needle, a work holder having openings therein for entry of the needle to stitch the work, said openings being spaced different distances apart lengthwise of the work holder to vary the location of the stitches in the work, and means for moving the work holder in successive steps past said needle, including a plurality of control elements carried by said work holder and arranged in succession longitudinally of the path of movement of the work holder, said elements each being formed independently to correspond to the spacing between successive openings in the work holder and means on the machine engageable with said elements to vary the length of each step in which said work holder is moved to bring each of said openings in succession into registry with said needle.

13. The method of forming rope soles, pads, mats or similar articles which comprises the steps of arranging rope, braid or other material from which the articles are to be made in the form of a flat coil, or plurality of superposed strands, compressing the material transversely of the strands, forming a hole through said strands, restraining the material about said hole to hold open the hole, passing thread through said hole while the material is so restrained to form a stitch and releasing the material about the hole while continuing to maintain the material under compression in a direction parallel to that in which said thread extends.

CAMILLUS C. ENRIGHT.